March 22, 1932. J. F. LAWSON 1,850,176
METHOD OF AND APPARATUS FOR ELECTRIC RESISTANCE WELDING
Filed July 3, 1930
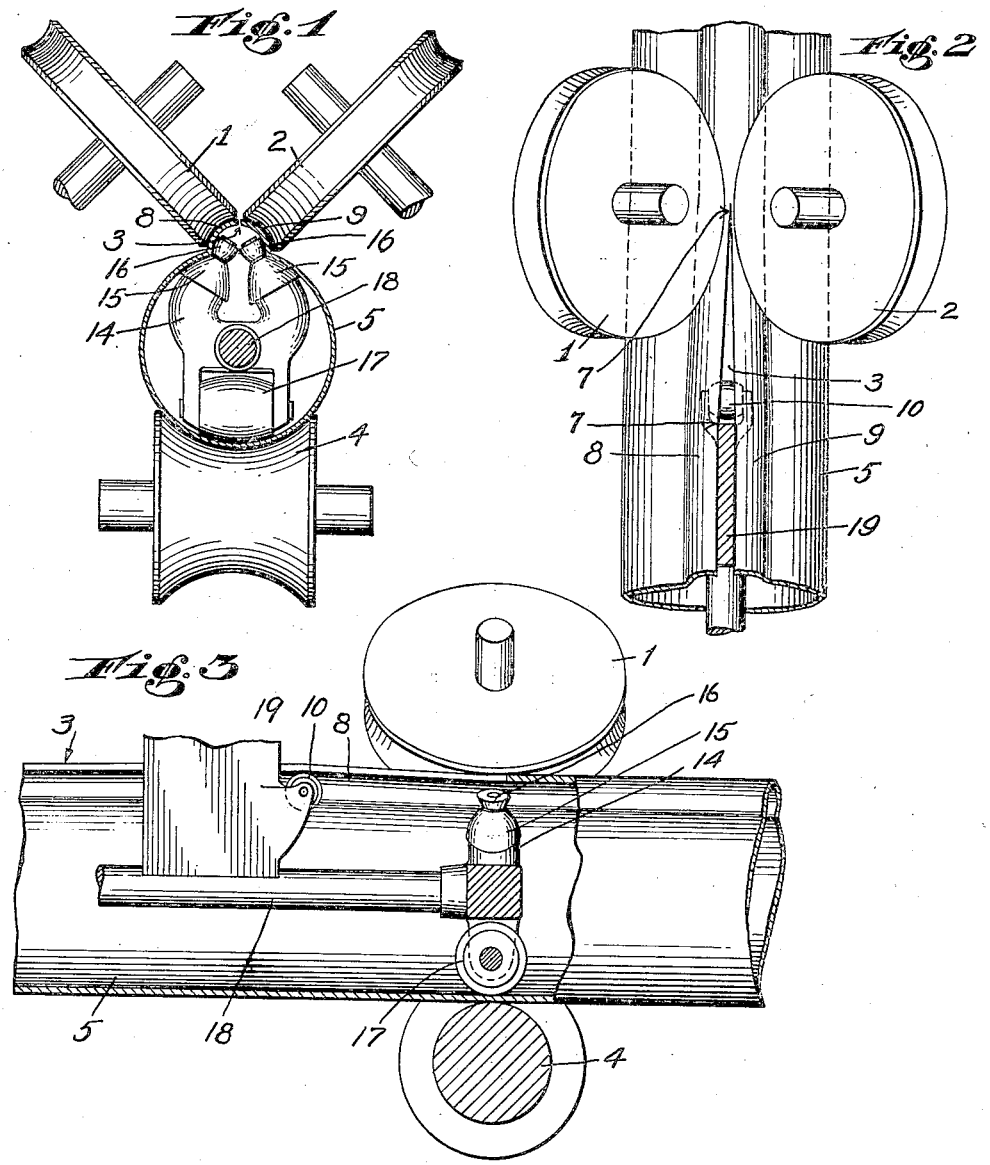

Patented Mar. 22, 1932

1,850,176

UNITED STATES PATENT OFFICE

JOHN F. LAWSON, OF BROOKLYN, NEW YORK

METHOD OF AND APPARATUS FOR ELECTRIC RESISTANCE WELDING

Application filed July 3, 1930. Serial No. 465,468.

This invention relates to the progressive electric-resistance butt and generally analogous welding of seams, and especially to the welding of longitudinal seams of tubular articles and the like.

In electric-resistance butt and generally analogous welding of, say, relatively long seams, the weld is made progressively beginning at one end of the seam and finishing it at the other. In order to press the two edges together point by point, with the pressure needed to effectuate the weld, the seam is held open some little distance in advance of the point where the weld is being made at the moment, and from thence the two edges are brought together along a V-shaped crevice, as it were, terminating at the welding point. Now other things being equal, certain sizes of tubing seam to be more easily welded than others. For example, in a certain welding plant tubing about two inches in diameter, of say eighteen to twenty gauge metal, seems to me more readily welded than tubing of either greater or less diameter.

The object of my invention is to provide a method of and apparatus for the progressive electric-resistance welding where it is difficult to form the V-shaped crevice between the edges to be welded. To this end, I project or depress one or both the edge portions of the work, forming thereby a protuberance extending lengthwise of the seam and usually partly on one side of the seam and partly on the other; at or in which protuberance one or both edges of the metals are presented for butt welding to the metal respectively at the opposite side for the seam. Preferably the protuberance is semi-circular in cross-section, or quarter round at each side of the seam, so that it forms a half of a tube as it were, and half a tube of such diameter as is readily welded. I then proceed to weld the seam much as in the usual manner, letting the electrode bear on the work close to and at the opposite sides of the seam; necessarily the electrodes (or at least one of them) bear on the protuberance as I have called it. The increased flexibility provided by the protuberance permits the readier formation of the V-shaped crevice, whence the weld is accomplised much as if the protuberance constituted the whole of the work rather than only a part of it. It will be apparent that the welding may be strictly of the simplest butt-welding, wherein the two edge surfaces are presented more or less exactly to each other, or departures from and/or modifications of this simplest butt-welding may be employed; for example, the welding described in my co-pending application, Serial No. 201,047 filed June 24, 1927, may be employed. In general then, by the term "butt-welding" I herein refer to any progressive electric-resistance methods in which the V-shaped crevice is employed.

To resist the thrust of the electrodes in welding machines for carrying out this method, I usually provide supports preferably in the form of rollers, to bear on the body portion of the work adjacent the protuberance; and preferably also supports for the metal of the protuberance adjacent the point or points whereat the protuberance springs from the body of the work. When the work is a tube or other tubular-shape article (the electrodes being outside the tube) the foregoing support or supports may be carried on a bracket bearing on the opposite side of the tube (internally) and an outside support for the tube provided opposite the bracket.

The accompanying drawings illustrate my invention applied to the (strictly) butt-welding of a tubular article of large diameter. Fig. 1 diagrammatically illustrates the electrodes and work-supports of the welding machine, the tube being shown in section. Fig. 2 is a plan view and Fig. 3 is a longitudinal section adjacent the same point of the welding machine.

As in conventional machines for the progressive welding of long seams in tubes, I employ preferably roller electrodes 1 and 2; these bear on the tube or tubular article 5 (which hereafter for brevity will be called simply a "tube"), constituting the work, at the opposite sides of the longitudinal seam 3 and rather close to the latter. A lower support roller 4 supports the tube 5 from below, against the downward thrust of the electrodes 1 and 2, substantially as in ordinary practice. At 8 and 9 the edge portions of the tube 5 are deformed to provide the protuberance, which, as shown, preferably has the form of half a tube of a diameter smaller than the diameter of the tube 5; and preferably a diameter such as may be conveniently welded. That is to say, for example, the horizontal diameter of the protuberance 8—9 may be about two inches, since tubes of this diameter weld comparatively readily. It will thus be observed that with tubes 5 of large diameters, the diameter of the protuberance may, and usually will be, very much less than the diameter of the main body of the tube 5. Such protuberance renders it possible to bring the edges of the seam 3 into the V-shaped arrangement illustrated at 7—7 in Fig. 2, fairly independently of the stiffness of, and the resistance to such disposition otherwise offered by, the main body of the tube 5, and hence promote the ready welding of the seam. As a spreader or to assist in opening the seam to form the V-shaped crevice a convex roller 10 may be employed to raise the edges of the metal slightly at this point, as is known practice.

To support the metal adjacent the seam, I preferably provide, in about the vertical transverse plane of the welding or about opposite the electrodes, two double-curved-conical rolls 15—16, the portion 16 of each of which is shaped to fit the inner surface of the protuberance 8—9 near where the protuberance springs from the body metal of the tube, while the opposite portion 15 is curved to support the body metal of the tube 5 adjacent the same points. For strictly butt-welding at least, the upper ends of these rolls will usually be spaced apart somewhat to leave the metal at the seam sufficiently free for manipulation by the electrodes. The rolls 15—16 may be supported by a bracket 14 provided, say, with a roller 17 to bear on the lower inner surface of the tube 5 opposite the support roll 4. A rod 18 inside the tube 5, held in place by a reach or bracket 19 from some fixed part of the welding machine and extending into the tube through the open portion of the seam 3 in advance of the point of welding, serves to locate the bracket 14 in the desired position with relation to 1, 2 and 4. The reach or bracket 19 can also serve to carry the spreader roll 10 as shown in Fig. 3.

Except as indicated, the welding is done as in common practice. The electrodes 1 and 2 bear on opposite sides of the protuberance 8—9. The welding current passes through the tube metal and across the seam in a path extruding between the electrodes. With the current flowing, the seam is passed lengthwise through the current path, and the electrodes exert the welding pressure on the seam, point by point successively, bringing the opposite edge portions into welding relation.

The protuberance 8—9 may be removed later, say by rolling, swaging or drawing, so that the tube 5 again (or for the first time) becomes entirely circular in cross-section, or assumes whatever other cross-section that may be desired. In various instances however it may not be necessary to remove the protuberance.

It will also be understood that the time of forming the protuberance 8 and the protuberance 9 at the two sides of the seam 3 is not involved in the present invention; they may be produced before the tube 5 is formed, or the rolled-up tube stock may be subjected to a projection-forming operation, such as swaging, drawing or rolling operation for example, subsequent to being rolled up; in the latter case, the projection-forming operation may be performed before the stock is brought to the welding machine, or simultaneously with feeding the stock to the welder.

The invention is not limited to the exact details illustrated and described, except as appears hereinafter in the claims.

Claims:

1. The method of closing a seam which consists in producing a protuberance at the seam, and then progressively closing the seam and exerting welding pressure by exerting pressure against a side of the protuberance and progressively butt-welding the edge surface at one side of the seam to the metal at the opposite side of the seam by the electric-resistance method.

2. The method of electric-resistance welding a seam, which consists in providing the work with a protuberance having the form of a part of a tube extending substantially longitudinally of the seam and part of which is at one side of the seam and part at the other, passing an electric current across the seam, passing the seam lengthwise through the path of said current, and exerting pressure on the protuberance of the two sides of the seam, at or adjacent the path of current, to progressively close the seam at or adjacent such path.

3. The method of electric-resistance welding a seam, which consists in providing the work with a protuberance having the form of a part of a tube extending substantially longitudinally of the seam and part of which is at one side of the seam and part at the 120 other, and the edge surfaces of which substantially face each other for butt-welding, passing an electric welding current across the seam, passing the seam lengthwise through the path of the current, and exerting welding pressure on the two sides of the protuberance at or adjacent the path of the current to progressively close the seam at or adjacent such path.

4. The method of claim 2 characterized by the additional feature of supporting the body of the work against the thrust of welding pressure adjacent the points whence the protuberance springs from the body of the work.

5. In an electric welding machine for butt-welding seams progressively, the combination of a welding electrode to bear on a protuberance from the body of the work and conduct welding current across the seam to be welded, and supporting means to resist the thrust thereof, to bear on the body of the work near where the protuberance springs from the body of the work.

6. In an electric welding machine for butt-welding seams progressively, the combination of a pair of welding electrodes to bear on the opposite sides of a protuberance from the work and conduct current across the seam in the protuberance to be welded, and supporting means, opposing the thrust of said electrodes, to bear on the body of the work near the points whence the protuberance springs from the body of the work.

7. In an electric welding machine for butt-welding seams progressively, the combination of a welding electrode to bear on a protuberance from the body of the work and conduct welding current across the seam to be welded, and supporting means, to resist the thrust thereof, to bear on the metal of the protuberance.

8. In an electric welding machine for butt-welding seams progressively, the combination of a pair of welding electrodes to bear on the opposite sides of a protuberance from the work and conduct current across the seam in the protuberance to be welded, and supporting means to bear on the opposite side of the metal of the protuberance from said electrodes near the points whence the protuberance springs from the body of the work.

9. In an electric welding machine for welding longitudinal seams of tubular articles progressively, the combination with a pair of welding electrodes constructed to contact with a protuberance at the seam of the article to be welded, means outside the article and substantially opposite said electrodes to support the article to be welded, and means for placement within the article to be welded, to contact with the inner surface of said article opposite the electrodes and also to contact with the inner surface of the article opposite said supporting means, to transmit the thrust from the welding electrodes to such supporting means.

10. The subject matter of claim 9 characterized by the fact that the said supporting means are rolls, and that a bracket is provided to carry the rolls which are within the article.

11. The subject matter of claim 9 characterized by the fact that the said means within the article to contact with the same opposite the welding electrodes, is a pair of double rolls, to engage said article within the protuberance on said article and also to engage said article outside said protuberance, but near the points whence the protuberance springs from the body of the article.

12. The subject matter of claim 9, characterized by the fact that said means within the article, in contacting with the inner surface of the article opposite the electrodes, contacts with said inner surface adjacent the points whence the protuberance springs from the body of the article.

In testimony whereof, I have signed this specification.

JOHN F. LAWSON.